UNITED STATES PATENT OFFICE.

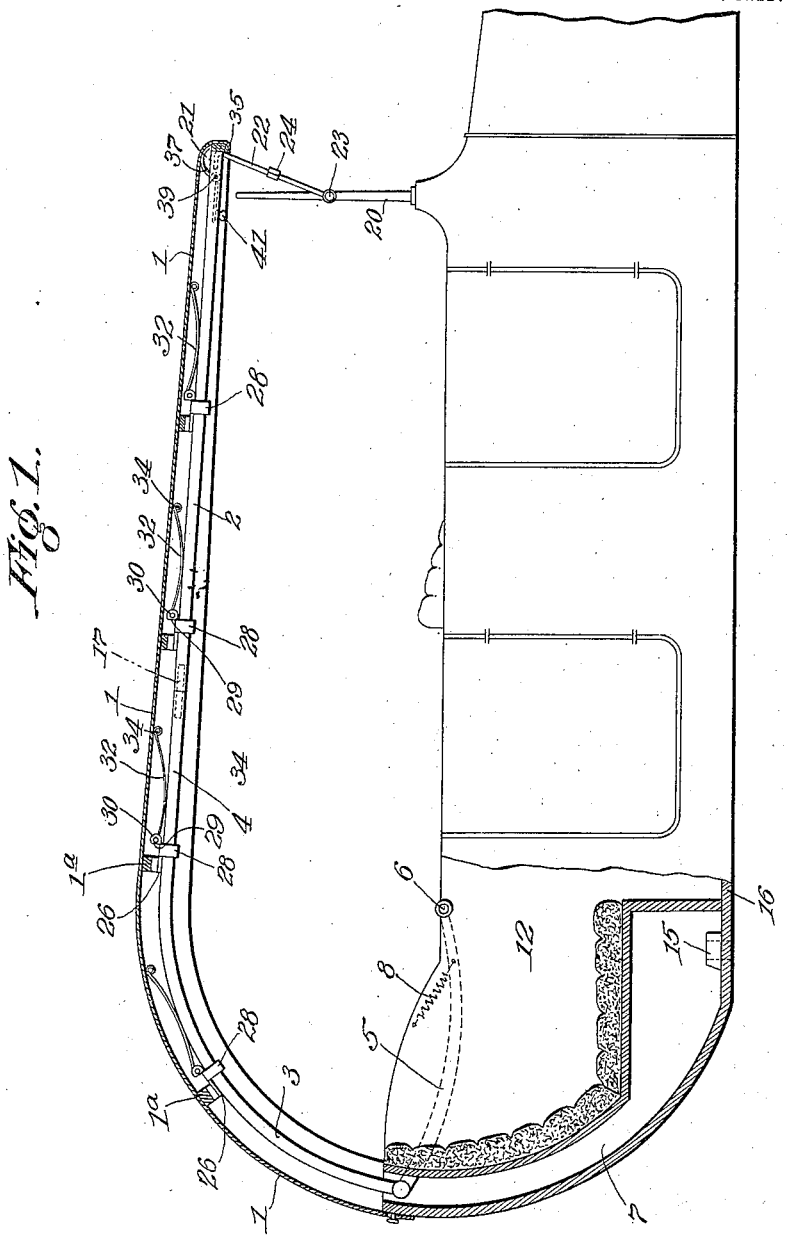

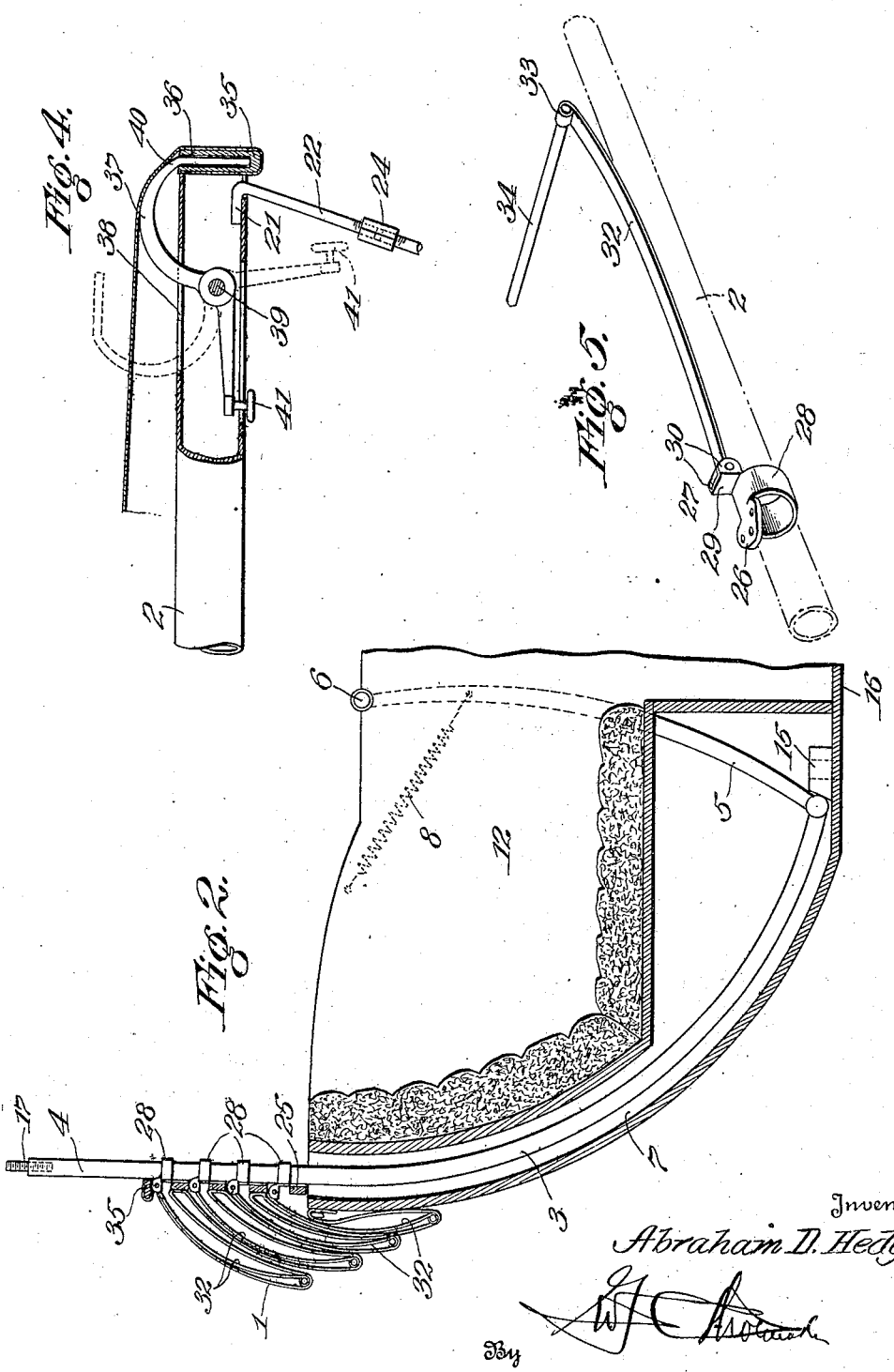

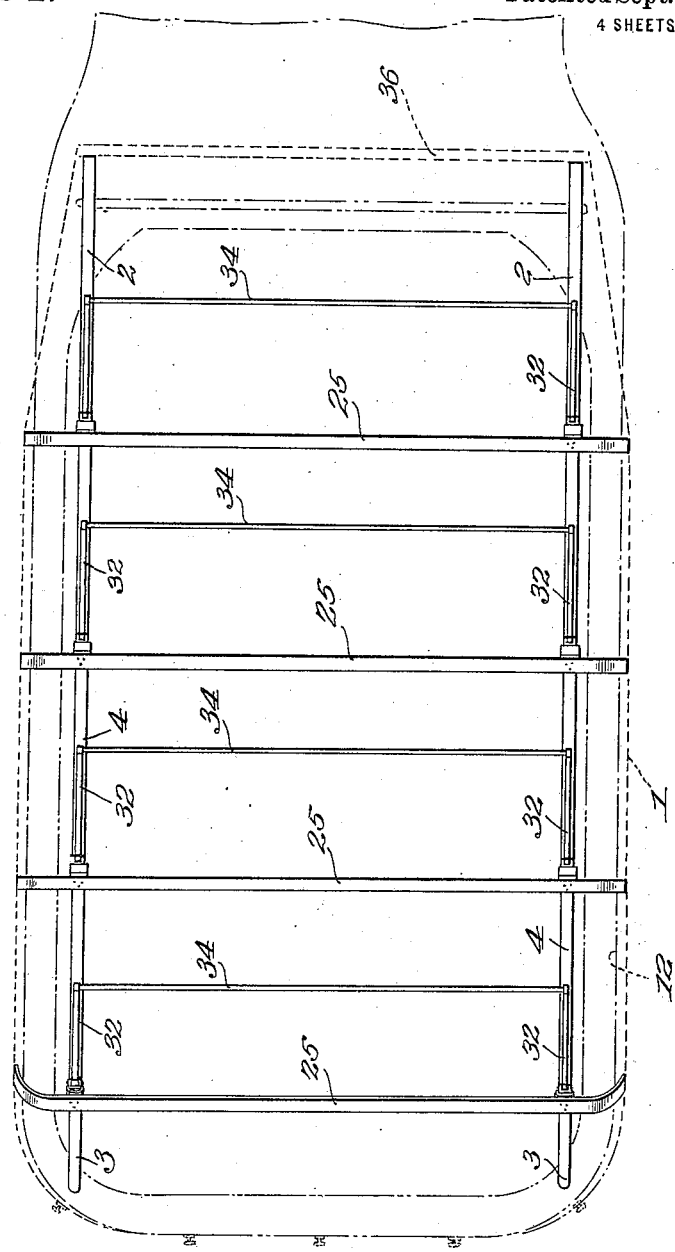

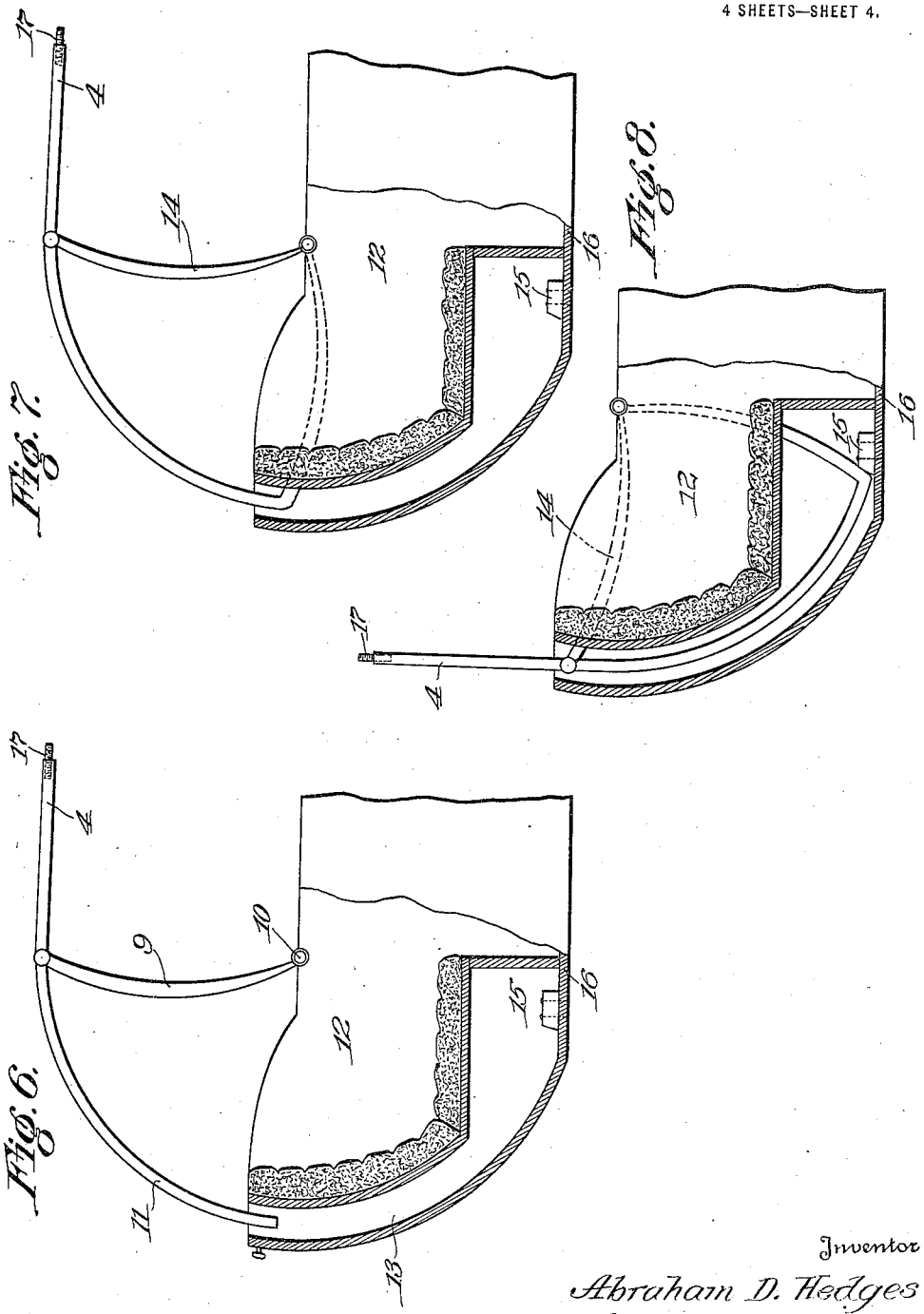

ABRAHAM D. HEDGES, OF LONG BEACH, CALIFORNIA.

FOLDING AUTOMOBILE-TOP.

1,390,554.  Specification of Letters Patent.  Patented Sept. 13, 1921.

Application filed August 21, 1919. Serial No. 318,917.

*To all whom it may concern:*

Be it known that I, ABRAHAM D. HEDGES, a citizen of the United States, residing at Long Beach, in the county of Los Angeles and State of California, have invented certain new and useful Improvements in Folding Automobile-Tops, of which the following is a specification.

This invention relates to improvements in automobile tops.

The object of the present invention is to improve the construction of automobile tops and more especially the construction of tops shown and described in applications, Nos. 272,270 and 272,271 filed by me January 21, 1919, and to provide a simple, practical and efficient automobile top of strong, durable and compact construction adapted to be readily arranged in a folded position at the rear of the automobile body and capable of being quickly and conveniently arranged for use.

Another object of the invention is to provide a folding one-man top of this character designed for use on automobiles and other vehicles and equipped with means for maintaining the flexible cover taut at all times whether the folding top be up or down.

It it also an object of the invention to provide yieldable resilient means adapted to connect the cover with the supporting framework and permit the bows and the flexible top to lie close to the framework without interfering with the use of folding spring arms which connect the cover with the frame work and which also maintain the cover taut in both positions of the automobile top.

With these and other objects in view, the invention consists in the construction and novel combination of parts hereinafter fully described, illustrated in the accompanying drawings and pointed out in the claims hereto appended, it being understood that various changes in the form, proportion, size and minor details of construction, within the scope of the appended claims, may be resorted to without departing from the spirit of the invention or sacrificing any of the advantages thereof.

In the drawings, in which like numerals of reference designate corresponding parts:—

Figure 1 is a longitudinal section view of an automobile top constructed in accordance with this invention and shown applied to an automobile body, the latter being partly in section and partly in elevation and the folding top being raised for use.

Fig. 2 is a similar view showing the automobile top in its folded position.

Fig. 3 is a plan view of the automobile top, the cover being shown in dotted lines.

Fig. 4 is an enlarged longitudinal sectional view through the front portion of one side of the automobile top.

Fig. 5 is a detail perspective view of one of the brackets and its folding arm.

Fig. 6 is a longitudinal sectional view illustrating another arrangement of the balancing arm.

Fig. 7 is a longitudinal sectional view illustrating the manner of bracing the curved section and the balancing arm.

Fig. 8 is a longitudinal sectional view of the construction shown in Fig. 7, the parts being folded.

Referring to the accompanying drawings in which is illustrated an embodiment of the invention, the framework which supports the flexible cover 1 is composed of spaced longitudinally disposed side members comprising straight tubular sections 2 and curved sections 3 having straight front portions 4 and is preferably constructed of tubular material. The curved sections 3 are rigidly connected at their rear ends with curved balancing arms 5 extending forwardly from the rear ends of the curved sections when the top is raised as illustrated in Fig. 1 of the drawings, and pivoted at 6 to the sides of the body by bolts or other suitable fastening devices, which permit the arms 5 to swing through an arc to arrange the curved sections in the extended position shown in Fig. 1 and in the folded position shown in Fig. 2. The rear portion of the body is provided at opposite sides with suitable openings 7 to receive the curved sections and the said sections are adapted through the swinging of the balancing arms to be moved upwardly and downwardly into and out of the opening 7 in the rear of the automobile body, and the arms 5 may be connected with coiled retractile springs 8 to assist in balancing the automobile top and to facilitate the raising and lowering of the same. The coiled springs 8 are attached at one end to the curved arms at a point intermediate of the terminals thereof and they are secured at their other end to the sides of the automobile body adjacent to the upper edges of the said sides, as clearly shown in Figs. 1 and 2.

If desired, the automobile top may be provided with curved balancing arms 9 pivoted at 10 to the automobile body and rigidly secured to the curved sections 11 of the side members of the framework at the juncture of the straight and curved portions of the sections 11, as illustrated in Fig. 6 of the drawing. The automobile body 12 will then be provided with curved openings or pockets 13 to receive the curved portions of the rear sections 11 of the side members of the framework. Also when the curved balancing arm is arranged as shown in Figs. 1 and 2 of the drawings, the automobile top may be provided with a bracing element 14 extending from the pivotal point of the curved balancing arm to the juncture of the straight and curved portions of the rear sections as illustrated in Fig. 7 of the drawings.

When the curved sections are folded within the rear portion of the body of the automobile, they abut at their lower ends against blocks 15 secured to the bottom 16 of the automobile body and designed to be constructed of wood or any other suitable material, but any preferred form of buffer or cushion may be provided for this purpose.

The straight sections 2 of the side members are connected with the straight portions of the curved sections 3 by plugs 17 threaded into the adjacent ends 18 and 19 of the sections 2 and 3, which are interiorly threaded to engage with the threads of the plugs 17. While in the accompanying drawings each of the side members of the supporting framework is provided with a single continuous straight section 2 extending from the straight portion 4 of the curved section 3 to the wind shield 20, any desired number of straight sections 2 may, of course, be provided, and if desired, the improvements herein shown and described may be applied to the sliding telescoping sections shown in the said application No. 272,271.

The front end of the section 2 constitutes a socket and is adapted to receive the bill 21 of a hook 22 pivotally mounted on the frame of the wind shield at the side thereof by means of a suitable bolt 23 and composed of adjustable sections having a threaded connection 24 to enable the stem or shank of the hook to be varied in length to engage properly the front section of the side member for holding the same tightly against the framework of the wind shield to prevent noise and rattling or accidental disengagement of the folding top. When the hooks are disengaged from the front sections of the folding top, the latter is adapted to be swung upwardly and rearwardly on the pivots of the balancing arms 5 and the front sections may be left in a projecting position or may be unscrewed and arranged in folds of the cover 1.

The curved sections 3 of the side members may be connected at intervals by transverse rods 25 arranged at suitable intervals and preferably disposed in flush relation with the curved side members and adapted to support the rear portion of the cover 1 and at the same time brace the curved sections 3 and form a rigid structure for carrying the cover 1. The cover, which may, of course, be made of any suitable and flexible material is designed to be stretched tightly over and suitably secured to the curved portions of the sections 3 and the transverse connecting frame members 25 thereof when the said frame members 25 are employed, but the frame members 25 may be omitted and the end of the cover 1 may be detachably secured to the back of the automobile body by any suitable fastening means. When, however, the rear portion of the cover is stretched over and secured to the curved sections, a portion of the cover 1 is carried into the opening 7.

The cover 1 is provided at intervals with transverse bows 1ª constructed of either wood or metal and secured to rearwardly projecting attaching flanges 26 of sliding brackets 27 consisting of sleeves 28 slidably mounted on the side members of the framework and provided at the top with the said flanges 26 and with front vertically disposed flanges 29 having spaced forwardly projecting ears 30. When the sleeve is arranged in a horizontal position the attaching flange 26 is disposed horizontally and extends rearwardly from the top of the sleeve, while the flange 29 projects vertically from the front of the sleeve. These flanges are preferably formed integral with the sleeve and the spaced ears 30 which project forwardly from the flange 29 receive a pintle 31 for pivoting a flexible resilient foldable arm 32 between the ears of the bracket. The flexible folding arm 32 which is constructed of resilient material, preferably light spring metal, is provided at its hinged end with an eye 33 and the other end of the flexible foldable arm 32 is secured to transverse cleats or members 34 constructed of either wood or metal and suitably secured to the lower face of the cover 1 in advance of and in spaced relation with the bows 1ª. When the cover 1 is extended over the supporting framework of the top, the flexible folding arms 32 extend forwardly over the brackets and are supported by the side members of the said framework and the flexible folding arms serve to stretch the cover 1 and maintain the same in such stretched relation. Also, the particular construction of the brackets enable the bows to be arranged close to the supporting framework. When the top is folded, as illustrated in Fig. 2 of the drawing, the brackets slide rearwardly on the side members of the supporting framework and the flexible folding arms swing downwardly and rearwardly to the positions illustrated in Fig. 2 serve to loop or fold the cover 1 and maintain the same in a compact position at the back of the automobile body. These folds are adapted to receive the front sections 2 when the latter are detached, or the front sections may be left in a projecting position if desired. The hinging of the flexible foldable arms 32 and their resilient structure enable them to readily swing from a rearwardly extended position to a forwardly extended position and to operate to stretch and straighten out the creases of the folds of the cover when the same is arranged for use.

The flexible cover 1 is provided at the front with a transverse cleat or bow 35 located in advance of the supporting framework when the cover is extended and provided at opposite sides with bores or sockets 36 which are adapted to be engaged by cover tightening levers 37 fulcrumed intermediate of their ends in slots 38 of the front sections of the side members by suitable pivots 39. The front arm 40 of the cover stretching lever 37 is approximately U-shaped, the outer side or leg being extended to engage in the socket 36. The arm 40 is adapted to be engaged in the socket 36 when the cleat or bow 35 is at or near the front end of the side member and in a substantially horizontal position upon the top of the same and the lever may then be swung on its pivot to carry the front bow 35 to a position in advance of the framework of the hooks engaged with the same. This will place the cover under tension and will lock the levers 37 in position as the extended ends of the front arms 40 project below the plane of the side members and the strain will operate to hold the levers in their engaging position. Any suitable means such as a pivoted button or cap may be employed for locking the levers in their engaging position should it be desired and the pivoted hooks will be retained in their engagement as they are located between the front bow 35 and the framework. When the cover tightening lever is in its engaging position the operating arm which is provided with a suitable knot or handle 41 is arranged in a horizontal position in the slot or bifurcation 38 and said operating arm is adapted to be swung downwardly and forwardly to release the front bow. This will permit the cover to be folded and the hooks to be swung downwardly out of engagement with the top frame or supporting framework.

What is claimed is:—

1. An automobile top including a top frame comprising side rods having straight front portions extending from the back of the vehicle to the front thereof, said side rods being also provided with downwardly curved rear portions, and approximately horizontal balancing arms extending forwardly from the lower terminals of the curved rear portions and pivotally connected to the body of the vehicle and adapted to effect a counterbalancing of the forwardly extended portions of the side rods.

2. An automobile top including a top frame comprising side rods having straight front portions extending from the back of the vehicle to the front thereof, said side rods being also provided with downwardly curved rear portions, and substantially horizontal counterbalancing arms extending forwardly from the lower terminals of the rear curved portions of the side rods and bowed downwardly, and means for pivotally mounting the counterbalancing arms on an automobile to permit the curved portions of the said side rods to swing into and out of the body, said arms counterbalancing the forwardly extended straight portions of the side rods.

3. An automobile top including a top frame comprising side rods having straight front portions extending from the back of the vehicle to the front thereof, said side rods being also provided with downwardly curved rear portions, and approximately horizontal balancing arms extending forwardly from the lower terminals of the curved rear portions and pivotally connected to the body of the vehicle and adapted to effect a counterbalancing of the forwardly extended portions of the side rods, and a spring connected with the counterbalancing arm and with the body and adapted to facilitate the upward and downward movements of the top frame.

4. An automobile top including a top frame composed of side rods having curved rear portions and straight front portions, a cover stretched over the top frame and secured to the front ends of the side rods and yieldable means arranged at intervals for connecting the cover with the side rods for stretching the cover, said yieldable means extending in the direction of the cover when the same is arranged for use.

5. An automobile top including a top frame, a flexible cover, a bracket mounted on the top frame, and an arm hinged to the bracket and connected at its other end with the cover and normally extending longitudinally of the frame in the direction of the cover when under tension for stretching the cover and adapted to swing to a position at an angle to the frame to arrange the cover in substantially accordion folds.

6. An automobile top including a top frame, a flexible cover, a bracket mounted on the top frame, a flexible resilient arm hinged to the bracket and connected with the cover at a point spaced from the bracket longitudinally of the frame and normally extending longitudinally of the said frame in the direction of the cover when under tension for stretching the cover and arranged to swing to a position substantially at right angles to the frame to fold the flexible cover into substantially accordion folds.

7. An automobile top including a top frame, a cover, a bow secured to the cover, a bracket mounted on the top frame and having a flange attached to the bow, said bracket being also provided with spaced projecting ears, and an arm hinged between the ears and connected with the cover at a point spaced from the bracket and arranged to swing from one side of the bracket to the opposite side thereof.

8. An automobile top including a top frame, a cover, a bracket consisting of a sleeve embracing the top frame and provided with front and rear flanges, a bow carried by the cover and secured to the rear flange, and a folding arm hinged to the front flange and connected with the cover at a point spaced from the bow and arranged to swing from one side of the bracket to the opposite side thereof.

9. An automobile top including a top frame, a cover, a bracket consisting of a sleeve embracing the top frame and provided at the back with a projecting attaching flange and having at the front a projecting flange provided with spaced ears, a bow carried by the cover and secured to the rear flange, a cleat secured to the cover in spaced relation with the said bow, and a folding arm hinged between the said ears and secured to the said cleat, said arm being arranged to swing from one side of the bracket to the other.

10. An automobile top including a top frame having side members provided with curved rear portions, said side members being also provided at the curved rear portion with forwardly extending arms provided with means for pivoting them to an automobile body to permit the said curved portions to swing upwardly and downwardly, a cover stretched over and secured to the curved portions of the top frame and extending to the front of the latter, and brackets slidable on the side members of the top frame and connected to the cover at spaced points and provided with swinging arms also connected with the cover and arranged to fold the latter at the back of the automobile and adapted to stretch the cover when the same is extended for use.

11. An automobile top including a top frame provided at the front with a socket and hinged at the back of the automobile to permit the top frame to swing, a hook pivoted to the wind shield of the automobile and extending into the said socket and located at the front of the top frame, and a flexible cover arranged on the top frame and provided at the front with a cleat located exteriorly of the said hook in position for retaining the same in engagement with the socket of the top frame.

12. An automobile top including a top frame hinged at the back and arranged to swing upwardly and downwardly and provided at the front with tubular portions forming sockets, hooks pivoted to the wind shield of the vehicle and having bills extending into the front ends of the tubular side portion of the top frame and the flexible cover stretched over the top frame and provided at the front with a transverse cleat located in advance of the top frame exteriorly of the said hooks for retaining the same in engagement with the said sockets.

13. An automobile top including a top frame hinged at the back and arranged to swing upwardly and downwardly, said top frame being provided at the front with sockets, hooks pivoted to the wind shield of the automobile and having bills projecting into the said sockets, said hooks being composed of adjustable sections adapted to be adjusted for retaining the top frame firmly against the wind shield, and a flexible cover stretched over the top frame and provided at the front with a transverse cleat extending downwardly exteriorly of the hooks and retaining the same in engagement with the said socket.

14. An automobile top including a top frame composed of side rods, a cover arranged on the top frame and provided at the front with a transverse bow or member fitted against the front ends of the side rods of the top frame, and a cover tightening lever pivoted to the side rod of the top frame at a point spaced from the front end of the same and arranged to engage the transverse bow or member for stretching the cover over the front ends of the said rods, said front bow being rigidly supported by the side rods.

15. An automobile top including a top frame composed of side rods, a cover arranged on the top frame and provided at the front with a transverse bow or member fitted against the front ends of the side rods of the top frame, and a cover tightening lever pivoted to the side rod of the top frame at a point spaced from the front end of the same and arranged to engage the transverse bow or member for stretching the cover over the front ends of the said rods, said front bow being rigidly supported by the said side rods, said lever being fulcrumed intermediate of its ends and provided with means for securing it in position to retain the cover in a stretched condition.

16. An automobile top including a top frame having a side rod provided with a tubular front portion, said front portion being provided with a slot, a cover having a front bow, a cover tightening lever pivoted in the slot or bifurcation at a point spaced from the front end of the said rod and arranged to engage the bow to stretch the cover over the front end of the side rod and hold the same in a stretched condition, and a pivoted hook mounted on the wind shield and engaging the top frame and arranged between the same and the cover and retained by the latter in engagement with the said top frame.

17. An automobile top including a top frame hinged at the back and provided with a tubular front portion having a slot, a cover provided with a front bow, a cover stretching lever pivoted in the slot of the tubular front portion of the top frame at a point spaced from the front end of the tubular portion and having an approximately U-shaped front arm engaging the front bow and arranged to carry the same over the end of the said tubular portion of the top frame into engagement with the same, and a fastening device mounted on the wind shield and engaging into the tubular portion of the top frame and interposed between the same and the front bow or member of the cover whereby the said front bow or member is adapted to retain the said fastening device in engagement with the tubular portion of the top frame.

18. An automobile top including a top frame hinged at the back and provided with a tubular front portion having a slot, a cover provided with a front bow, a cover stretching lever pivoted in the slot of the tubular front portion of the top frame at a point spaced from the front end of the tubular portion and having an approximately U-shaped front arm engaging the front bow and arranged to carry the same over the end of the said tubular portion of the top frame into engagement with the same, and a pivoted hook mounted on the wind shield and extending into the end of the tubular portion of the top frame and interposed between the same and the said bow or member whereby the latter is adapted to retain the hook in engagement with the top frame.

In testimony whereof I affix my signature.

ABRAHAM D. HEDGES.